(12) United States Patent
Lauzier et al.

(10) Patent No.: US 8,091,198 B2
(45) Date of Patent: Jan. 10, 2012

(54) RECONFIGURABLE PALLET

(75) Inventors: Nicolas Lauzier, Ste-Flavie (CA); Mark A. Shilakes, Romeo, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 930 days.

(21) Appl. No.: 12/108,732

(22) Filed: Apr. 24, 2008

(65) Prior Publication Data

US 2009/0267280 A1  Oct. 29, 2009

(51) Int. Cl.
*B21K 21/16* (2006.01)
*B23Q 3/00* (2006.01)
(52) U.S. Cl. .................................. 29/401.1; 269/289 R
(58) Field of Classification Search ................. 29/401.1, 29/559, 759, 760, 772, 799, 281.1, 281.6; 269/289 R; 108/91, 55.3, 54.1; 414/807
See application file for complete search history.

(56) References Cited

U.S. PATENT DOCUMENTS 3,863,878 A * 2/1975 Gregory et al. .......... 248/295.11
7,044,066 B1 * 5/2006 Miller .......................... 108/55.3
* cited by examiner

*Primary Examiner* — John C Hong
(74) *Attorney, Agent, or Firm* — Quinn Law Group, PLLC

(57) ABSTRACT

A pallet includes a platform and a plurality of support assemblies located at multiple positions on the platform. One support assembly is associated with each location of the component to be supported. Each support assembly has a linkage assembly to support and enable movement of a support element to position the support element in a desired location for each version of a component. A support element locking mechanism on each support element allows for selectively preventing vertical movement of the support element relative to the linkage assembly. Additional locking mechanisms associated with the linkage assembly prevent movement of the linkage assembly relative to the base.

16 Claims, 4 Drawing Sheets

RECONFIGURABLE PALLET

TECHNICAL FIELD

The present invention relates generally to pallets for assembly plants, and more specifically to a reconfigurable pallet.

BACKGROUND OF THE INVENTION

During assembly of vehicles in an assembly plant individual components must be supported prior to installation in the vehicle. In the case of heavy or bulky components it may be necessary or desirable to support these components in a specific configuration which facilitates installation of the component into the vehicle. For example, it may be desirable to support the component in an orientation which corresponds to its in-vehicle orientation and in a manner which enables access to locations, such as boltholes, used to attach the component to the vehicle.

An example of this is a vehicle engine or powertrain (i.e. engine plus transmission), where engine and/or powertrain specific support structures are used for the purpose of presenting the engine or powertrain to the vehicle body in a manner which facilitates attachment of the engine or powertrain to the vehicle body.

Commonly, customers may be offered various hardware options, such as engines or powertrains, with a specific vehicle body. Hence, to meet the need described above, multiple support structures must be employed each of which will be specific to a single hardware option or component version and which will be incapable of being used for other options. Frequently, for convenience and to ensure their strength and rigidity, these support structures are mounted on a platform. Together the support structure and the platform to which is attached constitute a pallet. As a result, a unique pallet is required for each version of the component associated with the assembly line.

In addition, it is useful to maintain the components in orientation which corresponds to its in-vehicle orientation during testing of components. During this stage many different component configurations must be accommodated. Often changes occur as a result of or during the testing process leading to even more configurations.

SUMMARY OF THE INVENTION

A pallet that can be reconfigured to support multiple versions of a component is desired.

A pallet of the present invention includes a platform and a plurality of support assemblies located at multiple positions on the platform. One support assembly is associated with each support location of the component. The support assemblies each include a support element and a linkage assembly to guide and support the support element.

The linkage assembly has a foundation secured to the platform. A first arm is rotatably connected to the foundation with a first joint and a second arm is rotatably connected to the first arm with a second joint. Locking mechanisms can be associated with the first joint and the second joint to selectively prevent rotation. An aperture for receiving the support element is defined by the second arm. A threaded interface allows the support element to be adjusted in the vertical direction as desired. A support element locking mechanism selectively prevents vertical movement of the support element within the aperture.

To configure the support assembly for another version of the component the locking mechanisms are released. The support element is moved horizontally, as desired, and the locking mechanisms are again secured. The support element locking mechanism is then released and the support element is moved within the aperture for vertical adjustment. The support element locking mechanism is then secured to fix the support element in position. In this manner, the pallet can be configured for use with any type of component and is not limited to predetermined mounting locations.

In another embodiment the linkage assemblies are secured to bases which are slideably mounted to the pallet. Sliding of the base along the pallet provides greater horizontal adjustment of the support element. The base can be secured from movement with a base securing device to prevent movement during pallet use.

The support assemblies allow the pallet to quickly and easily be reconfigured by a single operator. Associating a locking mechanism with each support element allows each support element to utilize only one linkage assembly for support and movement while providing selective restriction of movement in the vertical direction. Providing a reconfigurable pallet to be used with multiple versions of a component reduces costs.

The above features and advantages, and other features and advantages of the present invention will be readily apparent from the following detailed description of the preferred embodiments and best modes for carrying out the present invention when taken in connection with the accompanying drawings.

DESCRIPTION OF THE PREFERRED EMBODIMENTS

Figure 1:
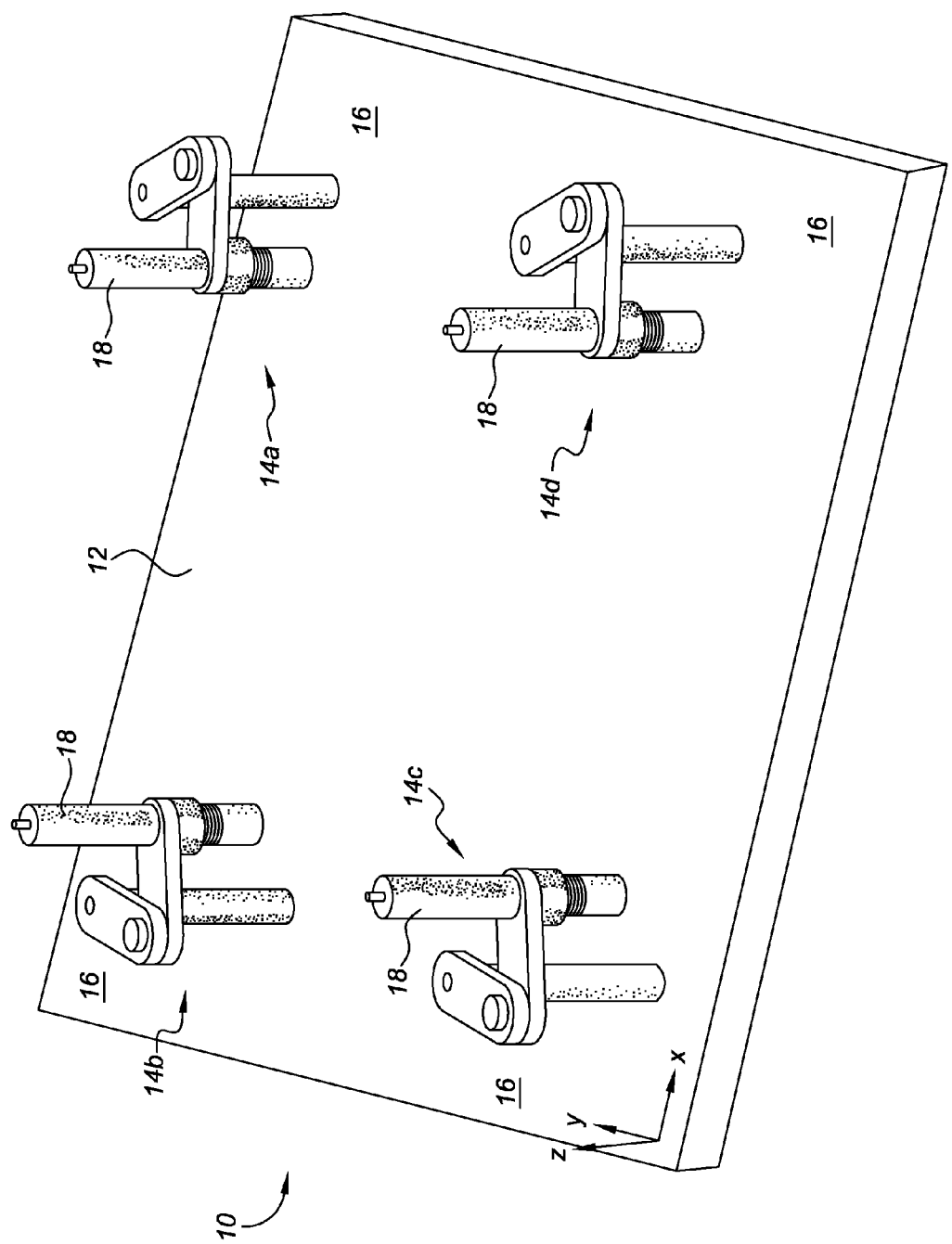
FIG. 1 is a perspective view illustrating a first embodiment of a support assembly for reconfigurable pallet of the present invention.

Referring to the Figures, wherein like reference numbers refer to the same or similar components throughout the several views, FIG. 1 is a perspective view of an exemplary pallet 10 of the present invention.

The pallet 10 includes a platform 12 and a plurality of support assemblies 14 located at multiple positions on the platform 12. As shown, four support assemblies 14a-d are located one at each corner 16 of the platform 12. One support assembly 14 is associated with each support location for the component. The number and location of the support assemblies 14 is determined by the design and type of the component to be supported. X, y and z directions are defined by the pallet 10. Each support assembly 14a-d is located at a specific x-y-z coordinate as described below.

Figure 2:
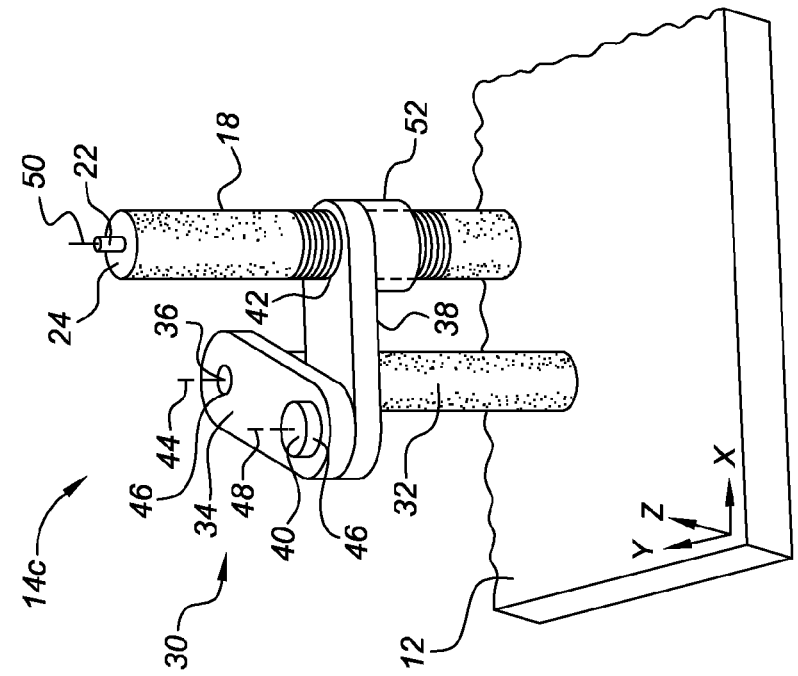
FIG. 2 is an enlarged partial perspective view of the first embodiment of one support assembly for the pallet of the present invention.

FIG. 2 illustrates an enlarged partial perspective view of one section of the pallet 10 showing one of the support assemblies 14c. The other support assemblies 14a, b and d on the pallet 10 are configured in the same manner as described herein. The support assembly 14c includes a support element 18. The support element 18 includes a locator 22 along an end 24, as shown. The locator 22 corresponds to a predetermined location on the component which has a mount for alignment with the locator 22. The locator 22 is positioned at a specific location and height to correspond to the component mount. In the embodiment shown, the locator 22 is a pin that could correspond to a female receptacle defined by the component at the mount. For example, the component is an engine and a pin receiver is positioned on the engine at the component mount location. Alternately, the locator 22 may be a support plane on the support element 18 that corresponds to a plane on the component at the mount. Other arrangements may be used for the locator 22, such as, a female receptacle defined by the locator 22 and a male coupling on the component at the mount.

Each support element 18 is constrained by a linkage assembly 30. The linkage assemblies 30 guide and support the support element 18. Each linkage assembly 30 has a foundation 32 secured to the platform 12. A first arm 34 is rotatably connected to the foundation 32 with a first joint 36. A second arm 38 is rotatably connected to the first arm 34 with a second joint 40. An aperture 42 for receiving the support element 18 is defined by the second arm 38 and is positioned remotely from the second joint 40. The support element 18 can be rotated and adjusted vertically, in the z direction, through a threaded engagement with the aperture 42.

The first joint 36 rotatably connects the first arm 34 to the foundation 32. The first arm 34 rotates about a first axis 44 that is oriented in the z direction. The second joint 40 rotatably connects the second arm 38 with the first arm 34. The second arm 38 rotates about a second axis 48 that is also oriented in the z direction, and is parallel to the first axis 44. The x-y coordinate location of the second axis 48 may be changed by rotating the first arm 34 about the first axis 44. Both the first joint 36 and the second joint 40 may have a locking mechanism 46 associated therewith to selectively prevent rotation of the first arm 34 about the first axis 44 and the second arm 38 about the second axis 48. This prevents movement of the first arm 34 and the second arm 38 relative to the foundation 32 and thus, to the platform 12 when the pallet 10 is in use. Several embodiments of the locking mechanism 46 are detailed in FIGS. 3-5 with respect to the first joint 36.

Referring to FIG. 2, the support element 18 rotates within the aperture 42 about a third axis 50 that is oriented in the z-direction and parallel to the first and second axes 44 and 48. The x-y coordinate location of the third axis 50 may be changed by rotating the second arm 38 about the second axis 48 when the locking mechanisms 46 of the first and second joints 36 and 40 are released. Once the locking mechanisms 46 are locked, the x-y coordinate location of the third axis 50 is fixed. A support element locking mechanism 52 is also associated with each support element 18 to secure the support element 18 within the linkage assembly 30. Once the support element 18 is located in the desired horizontal and vertical position the support element locking mechanism 52 is secured. In the embodiment shown, in FIG. 2, the support element locking mechanism 52 is a nut that prevents undesired rotation of the support element 18 relative to the second arm 38. The support element locking mechanism 52 may also include another nut threaded on the support element 18 on the upward side of the second arm 38 if additional securing of the support element 18 is required To configure the support assembly 14a for another version of the component the locking mechanisms 46 are released. The support element 18 is moved horizontally, as desired, and the locking mechanisms 46 are again secured. The support element locking mechanism 52 is then released and the support element 18 is moved within aperture 42 for vertical adjustment. The support element locking mechanism 52 is then secured to fix the support element 18 in position. To reconfigure the entire pallet 10 this is repeated for each of the support assemblies 14a-d located on the pallet 10. In this manner, the pallet 10 can be configured for use with any type of component and is not limited to predetermined mounting locations.

Figures 3, 4, 5:
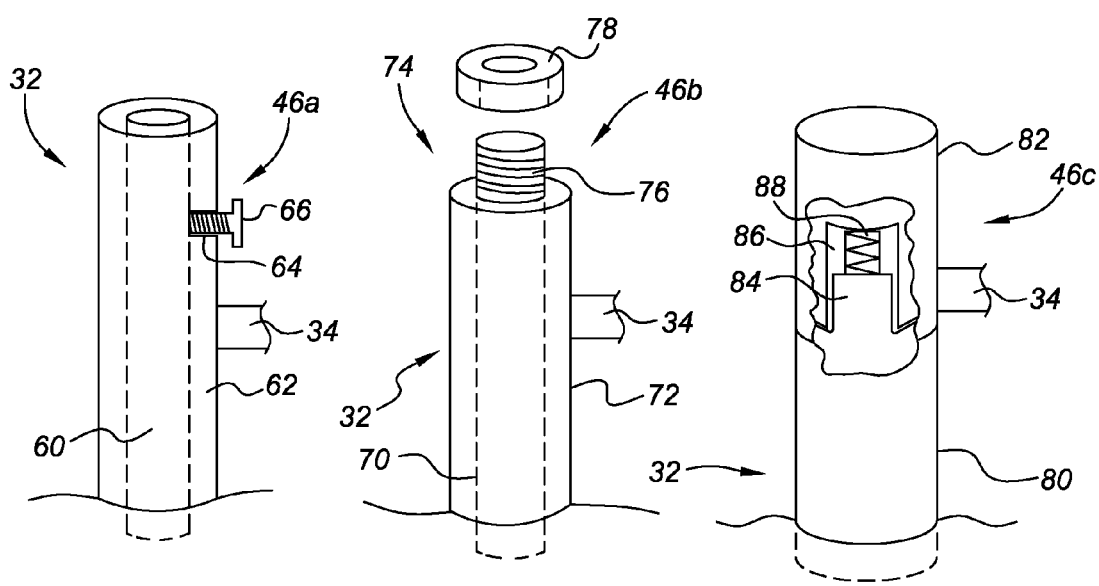
FIG. 3 is a perspective view illustrating a first embodiment of a locking mechanism for a linkage assembly of the reconfigurable pallet of the present invention.
FIG. 4 is a perspective view illustrating a second embodiment of a locking mechanism for a linkage assembly of the reconfigurable pallet of the present invention.
FIG. 5 is a cutaway schematic perspective view illustrating a third embodiment of a locking mechanism for a linkage assembly of the reconfigurable pallet of the present invention.

FIGS. 3-5 illustrate several embodiments of the locking mechanism 46. The locking mechanism 46 can be applied to first joint 36, as shown, or second joint 40. FIG. 3 shows the locking mechanism 46a having a foundation 32 which includes a platform portion 60 and an arm portion 62. The first arm 34 extends from the arm portion 62. The platform portion 60 is secured to the pallet 10 in a known manner. For example, the embodiment shown has a press fit between the platform portion 60 and the platform 12. The arm portion 62 is mounted to rotate about the platform portion 60. The arm portion 62 includes an opening 64 for receiving a screw 66, or the like. When the arm portion 62 is in the desired rotational position the screw 66 is threaded within the opening 64 and tightened to apply friction to the platform portion 60, preventing rotation between the platform portion 60 and the arm portion 62. The screw 66 is then loosened to reduce the friction and allow rotation of the arm portion 62 as necessary. Alternately, a pin or other element may be used to apply friction to the platform portion through the opening 64.

FIG. 4 shows the locking mechanism 46b having a foundation 32 which includes a platform portion 70 and an arm portion 72. The first arm 34 extends from the arm portion 72. The platform portion 70 is secured to the pallet 10, in a known manner. The arm portion 72 is mounted to rotate about the platform portion 70. A mounting location 74 of the platform portion 70 extends beyond the arm portion 72 to provide a surface 76 for receiving a nut 78. When the arm portion 72 is in the desired rotational position the nut 78 is threaded on surface 76 and is tightened to apply friction to the arm portion 72 preventing rotation between the platform portion 70 and the arm portion 72. The nut 78 is loosened to allow rotation of the arm portion 72 as necessary. Alternately, the nut 78 may include a handle to provide easier tightening and loosening by an operator. The nut 78 may also be replaced with other devices which can apply friction to the arm portion 72.

FIG. 5 schematically shows the locking mechanism 46c having a foundation 32 which includes a platform portion 80 and an arm portion 82. The first arm 34 extends from the arm portion 82. The platform portion 80 is secured to the pallet 10, in a known manner. The arm portion 82 is mounted to rotate about the platform portion 80. A mounting location 84 of the platform portion 80 extends into a cavity 86 defined within the arm portion 82. A tension spring 88, or the like, is located between the arm portion 82 and the mounting location 84. The tension spring 88 causes friction between the arm portion 82 and the platform portion 80 preventing rotation between the platform portion 80 and the arm portion 82. To move the arm portion 82 to the desired rotational position an operator moves the arm portion 82 in the z-direction to remove or reduce the friction between the arm portion 82 and the platform portion 80. The operator rotates the arm portion 82 to the desired rotational position and then releases the arm portion 82. The arm portion 82 returns to the original z-axis position and the tension spring 88 again applies friction between the platform portion 80 and the arm portion 82 to prevent rotation thereof.

Although several embodiments of locking mechanisms 46 are disclosed, other locking mechanisms 46 which would selectively prevent relative rotational movement between the foundation 32 and the first arm 34, or the first arm 34 and the second arm 38 may be utilized. Devices such as those utilizing friction elements, screws/pins, spring loads, etc., are known in the art for preventing relative movement between two elements and would be applicable as locking mechanisms 46.

Figure 6:
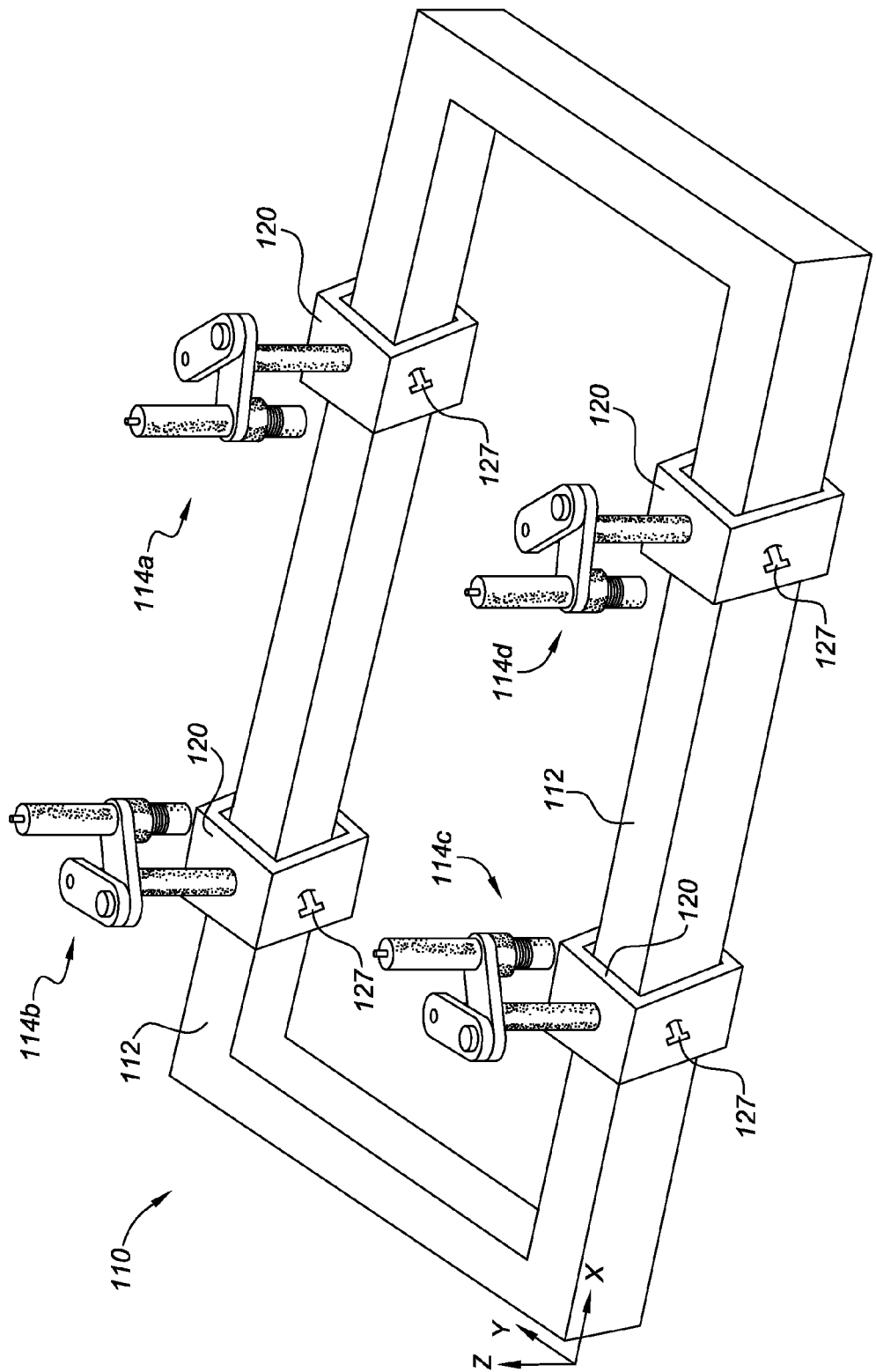
FIG. 6 is a perspective view illustrating a second embodiment of a support assembly for the reconfigurable pallet of the present invention.

FIG. 6 is a perspective view of another exemplary pallet 110 of the present invention. The frame or pallet 110 includes a platform 112 and a plurality of support assemblies 114 a-d. The support assemblies 114a-d are mounted on bases 120 which are moveably secured to the pallet 110 at multiple positions. X, y and z directions are defined by the pallet 110. Each support assembly 114a-d is located at a specific x-y-z coordinate as described below.

Figure 7:
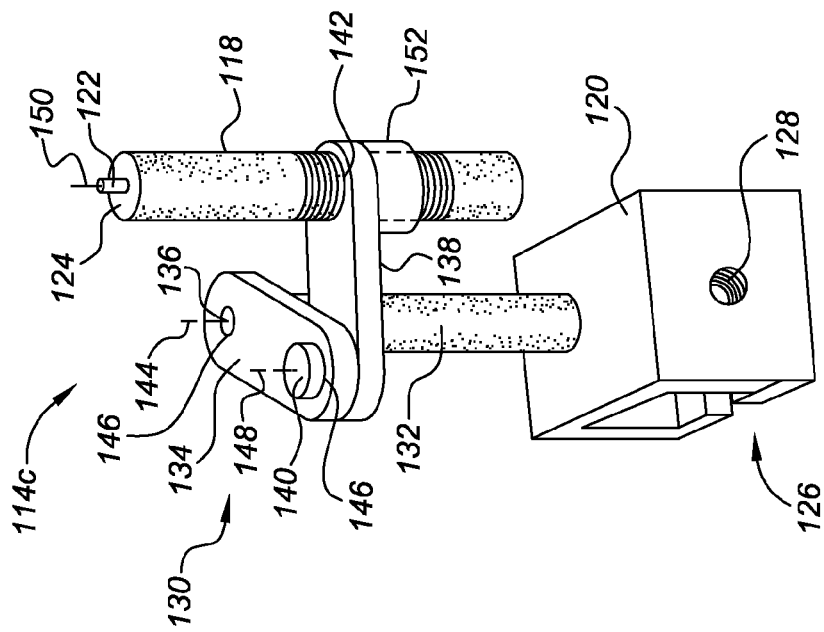
FIG. 7 is an enlarged perspective view of the second embodiment of one support assembly for the pallet of the present invention.

FIG. 7 illustrates an enlarged perspective view of one of the support assemblies 114c. The other support assemblies 114a, b and d on the pallet 10 are configured in the same manner as described herein. The support assembly 114c includes a support element 118. The support element 118 includes a locator 122 along an end 124, as shown. The locator 122 corresponds to a predetermined location on the component which has a mount for alignment with the locator 122. The locator 122 is positioned at a specific location and height to correspond to the component mount. In the embodiment shown, the locator 122 is a pin that could correspond to a female receptacle defined by the component at the mount. For example, the component is an engine and a pin receiver is positioned on the engine at the component mount location. Alternately, the locator 122 may be a support plane on the support element 118 that corresponds to a plane on the component at the mount. Other arrangements may be used for the locator 122, such as, a female receptacle defined by the locator 122 and a male coupling on the component at the mount.

Each support element 118 is constrained by a linkage assembly 130. The linkage assemblies 130 guide and support the support element 118. Each linkage assembly 130 has a foundation 132 secured to the base 120. A first arm 134 is rotatably connected to the foundation 132 with a first joint 136. A second arm 138 is rotatably connected to the first arm 134 with a second joint 140. An aperture 142 for receiving the support element 118 is defined by the second arm 138 and is positioned remotely from the second joint 140. The support element 118 can be rotated and adjusted vertically, in the z direction, through a threaded engagement with the aperture 142.

The first joint 136 rotatably connects the first arm 134 to the foundation 132. The first arm 134 rotates about a first axis 144 that is oriented in the z direction. The second joint 140 rotatably connects the second arm 138 with the first arm 134. The second arm 138 rotates about a second axis 148 that is also oriented in the z direction, and is parallel to the first axis 144. The x-y coordinate location of the second axis 148 may be changed by rotating the first arm 134 about the first axis 144. In addition, to provide greater adjustment the base 120 may be moved horizontally along the platform 112 to which it is secured. Both the first joint 136 and the second joint 140 may have a locking mechanism 146 associated therewith to selectively prevent rotation of the first arm 134 about the first axis 144 and the second arm 138 about the second axis 148. This prevents movement of the first arm 134 and the second arm 138 relative to the foundation 132 and thus, to the platform 112 when the pallet is in use. The embodiments of locking mechanism 46 described above and illustrated in FIGS. 4-6 may also be used with this embodiment of the pallet 110.

The base 120 may be locked in position on the platform 112 with base securing device 126. The base securing device 126 may be located on multiple sides of base 120 to provide additional securing of the base 120 to the platform 112. For example, threaded bolts 127 may be received within apertures 128 in the base 120. Multiple apertures 128 can be included on the base 120 to receive multiple bolts 127.

The support element 118 rotates within the aperture 142 about a third axis 150 that is oriented in the z-direction and parallel to the first and second axes 144 and 148. The x-y coordinate location of the third axis 150 may be changed by rotating the second arm 138 about the second axis 148 when the locking mechanisms 146 of the first and second joints 136 and 140 are released. Once the locking mechanisms 146 are locked and base securing device 126 is secured, the x-y coordinate location of the third axis 150 is fixed. A support element locking mechanism 152 is also associated with each support element 118 to secure the support element 118 within the linkage assembly 130. Once the support element 118 is located in the desired horizontal and vertical position the support element locking mechanism 152 is secured.

To configure the support assembly 114a for another version of the component the locking mechanisms 146 and base securing device 126 are released. The support element 118 is moved horizontally, as desired, and the base securing device 126 and the locking mechanisms 146 are again secured. The support element locking mechanism 152 is then released and the support element 118 is moved within aperture 142 for vertical adjustment. The support element locking mechanism 152 is then secured to fix the support element 118 in position. To reconfigure the entire pallet 110 this is repeated for each of the support assemblies 114a-d located on the pallet 110. In this manner the pallet 110 can be configured for use with any type of component and is not limited to predetermined mounting locations.

In the above embodiments an example of the component to be supported is an engine. This is in no way meant to be restrictive and other components may be utilized with the reconfigurable pallet of the present invention.

While the best modes for carrying out the invention have been described in detail, those familiar with the art to which this invention relates will recognize various alternative designs and embodiments for practicing the invention within the scope of the appended claims.

The invention claimed is:

1. A pallet for supporting a component comprising:
a plurality of support assemblies each mounted to a platform located in a horizontal plane, wherein each of the plurality of support assemblies includes a support element which is located in a vertical plane and is rotatable and moveable to a plurality of positions, and a linkage assembly mounted to the platform to enable movement of the support element to the plurality of positions, wherein the support element has a support element locking mechanism associated therewith to selectively prevent vertical movement of the support element relative to the linkage assembly, and wherein the support element is configured to be adjusted in a plurality of directions parallel to the platform via movement of the linkage assembly and in a direction perpendicular to the platform via movement of the support element relative to the linkage assembly.

2. The pallet of claim 1, wherein the linkage assembly further comprises a foundation secured to the platform, a first arm rotatably connected to the foundation and a second arm rotatably connected to the first arm, wherein the second arm defines an aperture to receive the support element.

3. The pallet of claim 2, wherein a first joint is located between the foundation and the first arm and a second joint is located between the first arm and the second arm, and wherein at least one of the first joint and the second joint have a locking mechanism associated therewith.

4. The pallet of claim 2, wherein the support element has a threaded connection with the second arm.

5. The pallet of claim 3, wherein the support element locking mechanism is at least one nut in threaded connection with the support element adjacent to the second arm.

6. The pallet of claim 1, wherein the linkage assembly is mounted to the platform via a base which is slideably mounted on the platform.

7. The pallet of claim 6, wherein a base securing device is associated with the base to selectively prevent sliding of the base relative to the platform.

8. A support assembly for a reconfigurable pallet comprising:
a base slidably mounted to a platform, wherein the platform is located in a horizontal plane;
a linkage assembly mounted to the base;
a support element which is located in a vertical plane and is operatively connected to the linkage assembly; and
a locking mechanism associated with the support element to selectively prevent movement of the support element in a vertical direction relative to the linkage assembly;
wherein the support element is configured to be adjusted in a plurality of directions parallel to the platform via movement of the linkage assembly and in a direction perpendicular to the platform via movement of the support element relative to the linkage assembly.

9. The support assembly of claim 8, wherein a base securing device is associated with the base to selectively prevent sliding of the base relative to the platform.

10. The support assembly of claim 8, wherein the linkage assembly further comprises a foundation secured to the platform, a first arm rotatably connected to the foundation and a second arm rotatably connected to the first arm, wherein the second arm defines an aperture to receive the support element.

11. The support assembly of claim 10, wherein a first joint is located between the foundation and the first arm and a second joint is located between the first arm and the second arm, and wherein at least one of the first joint and the second joint have a locking mechanism associated therewith.

12. The support assembly of claim 11, wherein the support element has a threaded connection with the second arm.

13. The support assembly of claim 12, wherein the support element locking mechanism is at least one nut in threaded connection with the support element adjacent to the second arm.

14. A method for reconfiguring a pallet comprising:
positioning a vertically oriented support element in a desired horizontal location by sliding a base having a linkage assembly mounted thereto and moving the linkage assembly in a horizontal direction;
actuating at least one locking mechanism to move from a released position to a locked position to prevent horizontal movement of the support assembly;
adjusting the support element vertically to place the support element in a desired vertical location relative to the linkage assembly; and
locking a support element locking mechanism to prevent vertical movement of the support assembly relative to the linkage assembly.

15. The method of claim 14, further comprising actuating the locking mechanism to move from the locked position to the released position, unlocking the support element locking mechanism, and repeating the positioning, the actuating, the moving and the locking of the support element relative to another desired horizontal and vertical location of the support element.

16. The method of claim 14, wherein the actuating further comprises securing a base securing device to prevent relative movement between the base and the platform.

* * * * *